United States Patent
Knauer et al.

(10) Patent No.: US 6,578,781 B2
(45) Date of Patent: Jun. 17, 2003

(54) METHOD FOR THE DISINTEGRATION SEWAGE SLUDGE

(75) Inventors: Jochen Knauer, Bad Homburg (DE); Jens Schmitt, Bad Schwalbach (DE); Jorg Schmitt, Bad Schwalbach (DE)

(73) Assignee: J.F. Knauer GmbH, Frankfurt (DE)

( * ) Notice: Subject to any disclaimer, the term of this patent is extended or adjusted under 35 U.S.C. 154(b) by 0 days.

(21) Appl. No.: 09/932,645

(22) Filed: Aug. 17, 2001

(65) Prior Publication Data

US 2002/0121564 A1 Sep. 5, 2002

(30) Foreign Application Priority Data

Aug. 18, 2000 (DE) .......................... 100 40 546

(51) Int. Cl.[7] .............. B02C 1/00; B01F 5/00
(52) U.S. Cl. .................. 241/21; 241/29; 241/46.17; 210/601; 210/709
(58) Field of Search .............. 241/14, 20, 21, 241/29, 46.17; 210/601, 603, 101, 105, 709

(56) References Cited

FOREIGN PATENT DOCUMENTS

| DE | 4029824 | * | 3/1992 |
| DE | 19719638 | * | 4/1998 |

* cited by examiner

*Primary Examiner*—W. Donald Bray
(74) *Attorney, Agent, or Firm*—Sidley Austin Brown & Wood, LLP

(57) ABSTRACT

There is a method for which a sewage sludge is permitted to flow from a first connecting region 21 to a treatment device, which works with rotation and stresses the sewage sludge with severing parts, and from the treatment device to a second connecting region 1. It is desirable to improve the continuity to the operation and to attain a decisive increase in the disintegration. This is achieved by using a rapidly rotating pipe-head formation, which has a head 6 with radial openings 10 and radial wings 4, for the mechanical disintegration of biogenic sewage sludge. The edges of the openings exert a shear effect, while the wings exert an impact effect and the combination of these two actions, in conjunction with the rapid rotation, brings about the improvement in the disintegration.

3 Claims, 1 Drawing Sheet

US 6,578,781 B2

METHOD FOR THE DISINTEGRATION SEWAGE SLUDGE

FIELD OF INVENTION

Figure 1:
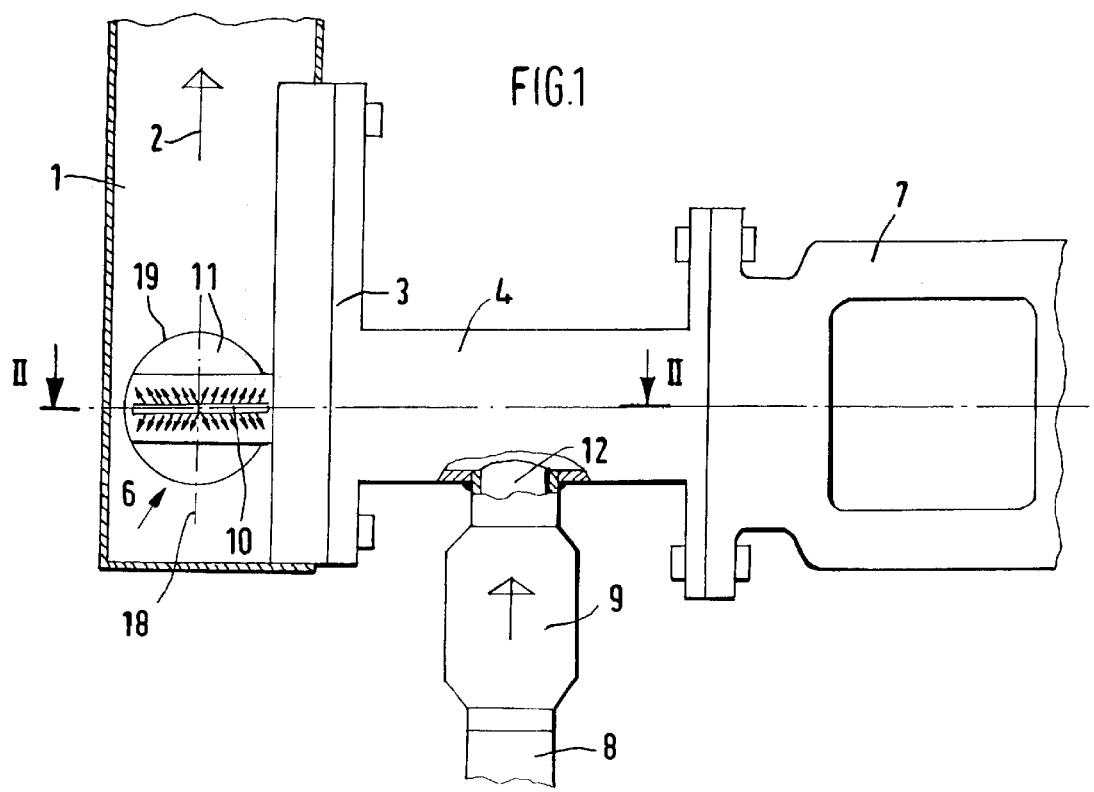

The invention relates to a method for the mechanical disintegration of biogenic sewage sludge, for which sewage sludge flows from a first connecting region to a treatment device, which works under rotation and stresses the sewage sludge with severing parts, and from the treatment device to a second connecting region.

BACKGROUND INFORMATION AND PRIOR ART

The sewage sludge under discussion here is at a biological purification stage, at which organic components, which can be decomposed easily, are converted into inorganic end products such as water, carbon dioxide or nitrogen. In order to accelerate this process, microorganisms are mixed with the sewage sludge, sludge flakes or aggregates of very fine suspended matter and microorganisms being formed. These aggregates comprise cells, formed by microorganisms. The effectiveness of the biological cleaning stage is improved by disintegrating the sewage sludge. The disintegration of the sewage sludge is understood to be the destruction of aggregates and cells.

A known method of disintegration a sewage sludge includes passing the sewage sludge through an apparatus including a stirrer shaft with a plurality of stirring discs mounted on the shaft in a spaced relationship to each other. The space between the stirring discs is filled with grinding bodies, e.g., balls which destroy the sludge. At the outlet of the apparatus, there is provided a screen for preventing the grinding bodies from being carried with the sludge. The above-discussed apparatus does not permit to achieve a high degree of the disintegration of aggregates and cells containing in the sludge. Moreover the screen at the outlet of the apparatus becomes rapidly clogged, which requires its often replacement which substantially increases operational and maintenance costs.

A device for mixing is known (DE 40 29 824 A1, DE 197 19 638 A1), which is a rapidly rotating pipe-head formation, having a head with radial openings and radial wings. This pipe-head formation is used for admixing a flocculating agent to the sewage sludge. From a first connecting region, the flocculating agent passes through the pipe-head formation and leaves the head in the sewage sludge. In the case of this main use of the rapidly rotating pipe-head formation, a noticeable disintegration of the sewage sludge is not achieved.

OBJECT OF THE INVENTION

It is an object of the invention to devise a method of the initially mentioned type, for which, with improved continuity of the operation, a decisive increase in the disintegration is achieved. The invention, accomplishing this objective, consists of the use of a very rapidly rotating pipe-head formation, having a head with radial openings and radial wings, for the mechanical disintegration of biogenic sewage sludge.

SUMMARY OF THE INVENTION

The invention thus provides a method of the initially mentioned type, for which, as sewage sludge treatment device, a rapidly rotating pipe-head formation is used, which has a head with radial openings and radial wings and is disposed with the head in the second connecting region, which is constructed as connecting space, and for which the wings and the edges of the openings stress the flow of sewage sludge, passing through the rapidly rotating pipe-head formation. The whole of the flow of sewage sludge, which is to be disintegrated, must therefore pass through the rapidly rotating pipe-head formation, that is, pass through the very rapidly moving edges of the openings and through the wings which, as severing parts, destroy aggregates and cells of the sewage sludge.

The edges of the openings exert a shearing effect. On the other hand, the wings exert an impact action and the combination of these two effects, in conjunction with the rapid rotation, bring about the improvement in the disintegration. The sewage sludge does not have to flow through screens and separating means. A rapid rotation is understood here to be one of 700 rpm or higher; as a rule, the rotation is faster than 1000 rpm, namely 2000 to 3000 rpm. With a thickened excess sludge (6% total solids), a maximum increase in the COD (=carbon content) of 430% and of the DOC (=directly available carbon) of 350% can be achieved.

Depending on the energy entered, the rpm of the rapid rotation and the achievable stresses at the sludge particles in the flow of sewage sludge, the following treatment results (treatment stages) can be represented:

1. Partial to complete comminution of the activated sludge flakes (aggregates) present, release and partial comminution of the sludge components bound adsorptively in and at the flake, increase in the proportion of fines in the particle size distribution, change in the surface charge, slight increase in the COD (dissolved).
2. Further comminution of the activated sludge flakes, release of individual microorganisms from the flake composite, shearing of exoenzymes, polysaccharides, etc. from the cell walls of the microorganisms, incipient comminution of organic sludge components up to bacteria-available orders of magnitude, increase in the COD (dissolved), measurable increase in enzyme activities, change in the surface charge, further increase in the fines proportion in the particle size distribution, rapid acceleration of the pre-acidification in the anaerobic medium.
3. Incipient deformation of cell walls up to complete destruction of cells, secretion of cell contents, distinct increase in the COD (dissolved), decrease in enzyme activity, high loading of process water with dissolved materials (re-dissolving).

It is conceivable to let the sewage sludge flow so that it enters the head and leaves the pipe-head formation at the pipe. However, it is particularly appropriate and advantageous if the sewage sludge leaves the pipe-head formation at the head. The disintegration is improved since first the shear effect and then the impact effect are exerted here.

It is also particularly appropriate and advantageous if a rapidly rotating pipe-head formation is used, for which the pipe, over radial openings, changes over into the first connecting region, which is constructed as a connecting space, and also the edges of the openings in the pipe stress the sewage sludge, passing through the rapidly rotating pipe-head formation. A shear effect is thus exerted at a second place on the sewage sludge and increases the measure of disintegration.

The combination of the edges of the openings of the head with the edges of the openings of the pipe causes the sewage sludge, which is to be disintegrated, to be sheared twice by the edges of the openings. The edges of the openings are configured as sharp as possible in the form of a knife edge and, moreover, also when only the edges of the openings of the head are provided.

In the following, preferred distinguishing features of the rapidly rotating pipe-head formation, which is used pursuant to the invention, are given, which are provided individually or in any combination with one another. The openings of the head and/or of the pipe are slot-like and elongated. In the axial direction, the wings are elongated strips. An opening and a wing alternate at the head in the direction of rotation.

A preferred example of the invention is shown in the drawing, in which

Figure 2:
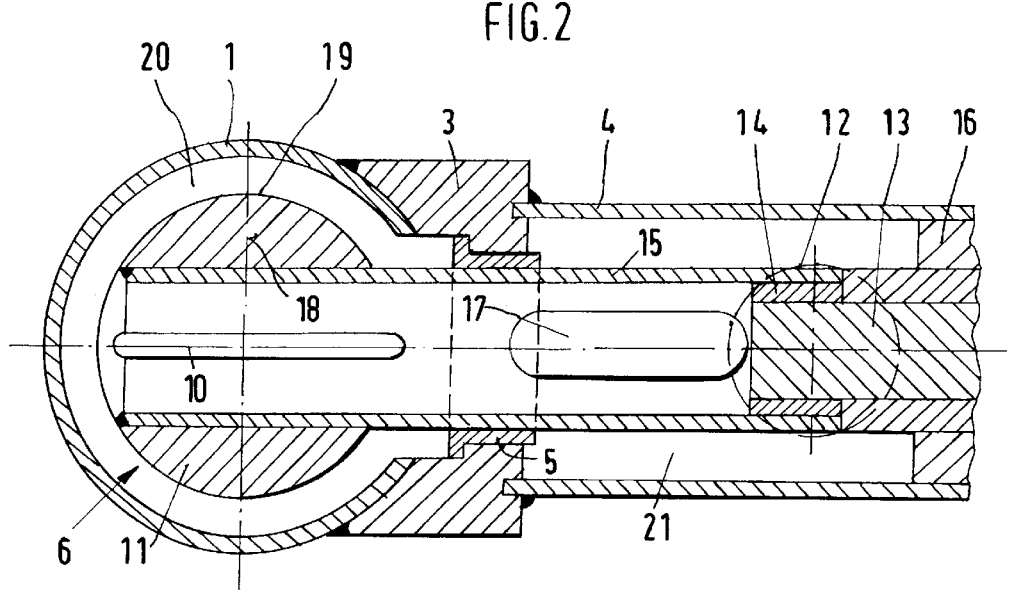

FIG. 1 shows a diagrammatic plan view, partially prized open, of a device for disintegrating sewage sludge and FIG. 2 shows a section along the line II—II in FIG. 1 on a larger scale.

The apparatus of the drawing is provided at a connecting space 1, which is constructed as a sludge pipe and in which a sewage sludge flows in the direction of arrow 2. The apparatus is mounted by means of an elongated flange 3 at the connecting space 1 and, outside of the connecting space, has a dome-shaped chamber 4, which protrudes from the flange 3. A head 6 protrudes from the dome-shaped chamber 4 into the connecting space 1 and can be rotated by means of a driving mechanism 7 which is mounted at the other end of the dome-shaped chamber and is constructed as an electric motor. A supply pipeline 8 for the sewage sludge, in which there is a check valve 9, discharges at the dome-shaped chamber 4. The head 6 forms slot-like openings 10 and carries strip-shaped wings 11.

A shaft extension 13, coming from the driving mechanism 7, carries over a bushing 14 a pipe 15 and a floating ring seal 16, which embraces the shaft extension 13, is provided in the front wall of the dome-like chamber 4. The pipe 15 has elongated openings 17, through which the sewage sludge passes from the dome-like chamber into the pipe. A connecting space 21, which surrounds the pipe 15 and from which the sewage sludge reaches the openings 17, is present in the dome-like chamber 4. The pipe 15 passes through a plain bearing bush 5, seated in the flange 3, into the connecting space 4 and is converted there, without a change in material, into the head 6, which is constructed in tubular fashion. A plane of rotation 18, which is indicated by a broken line, is assigned to the head 6. Each wing 11 forms a circularly curved edge 19, which, with appropriate attitude of the wing, forms the boundary of a gap 20 to the connecting space 1, which is circular in cross section.

What is claimed is:

1. A method of mechanically disintegrating a biogenic sewage sludge, comprising the steps of providing rotating pipe-head means including a head having a plurality of radial openings and a plurality of radial wings provided thereon, and drive means for rotating the head; and passing the sewage sludge through the radial openings of the rotating head, whereby aggregates and cells, which are contained in the biogenic sewage sludge, are destroyed as a result of a shear action produced by rotating edges of the radial openings, through which the sewage sludge flows, and an impact action produced by the rotating radial wings.

2. A method according to claim 1, wherein the sewage sludge flows from a first connection region to a second connection region, and wherein the pipe-head means is arranged in a flow path of the sewage sludge from the first connection region to the second connection region.

3. A method according to claim 2, wherein the head is located in the second connection region, and the disintegrated sewage sludge leaves the pipe-head means at the head.

* * * * *